United States Patent [19]
Schwarz et al.

[11] 3,718,120
[45] Feb. 27, 1973

[54] AUTOMATED KENNEL

[75] Inventors: Karl W. Schwarz, Boonton; Allan S. Borkowski; Joseph W. Hafesh, both of Fort Lee, all of N.J.

[73] Assignee: Modern Animal Care, Inc., Fort Lee, N.J.

[22] Filed: Nov. 9, 1971

[21] Appl. No.: 197,098

[52] U.S. Cl. ........................119/16, 119/19, 119/29
[51] Int. Cl. ................................................A01k 1/00
[58] Field of Search .........119/19, 29, 15, 16; 52/122

[56] References Cited

UNITED STATES PATENTS

| 1,552,288 | 9/1925 | Ford | 119/19 |
| 3,465,722 | 9/1969 | Duff | 119/19 X |

Primary Examiner—Louis G. Mancene
Assistant Examiner—J. N. Eskovitz
Attorney—Caesar, Rivise, Bernstein & Cohen

[57] ABSTRACT

An automated kennel is provided which has a receiving area for animals, a storage area for animals and an exercising area. The storage area has a plurality of discrete locations for storing animals. A plurality of movable compartments is provided, each of which is provided to house an animal in the storage area. Transfer means are provided for moving the compartments to the receiving area to receive and remove the animal, to the storage area for storing the animal at one of the discrete locations and to the exercising area to enable an animal to run into the area. The exercising area has a movable wall for gently returning the animal to the compartment after a predetermined period and control means are provided which are connected to the transport means for automatically transporting the animals to the various areas of the kennel. In addition monitoring means are provided throughout the system so that the animals can be watched and physiologically monitored simultaneously.

14 Claims, 8 Drawing Figures

AUTOMATED KENNEL

This invention relates generally to kennels and more particularly to an automated kennel in which manual functions are completely automated and in which facilities are made most pleasant for the animal as well as providing a complete monitoring system to insure the physiological well being of the animals at the kennels. Contemporary boarding kennels require various employees to perform functions such as cleaning individual compartments, exercising the pet, feeding, retrieving, cleaning the animal and disinfecting as well as other kennel functions. Because of the personnel required, it is expensive to run such a kennel because personnel willing to perform sanitary functions are difficult to find. In addition, in a large kennel, it is almost impossible to keep track of the various animals stored in the kennel so that surveillance of the animals well being is substantially neglected.

It is, therefore, an object of the invention to overcome the aforementioned disadvantages.

Another object of the invention is to provide a new and improved automated kennel which is adapted to obviate most manual tasks.

Another object of the invention is to provide a new and improved automated kennel which provides a relatively simple and economical means for providing dog kennel services with only a single operator to perform the functions.

Another object of the invention is to provide a new and improved kennel in which physiological monitoring and visual monitoring facilities are provided so that pets housed in the kennel are constantly under the surveillance of the operator of the kennel.

These and other objects of the invention are achieved by providing an automated kennel comprising a receiving area for animals, a storage area for animals, and an exercising area. The storage area has a plurality of discrete locations for storing animals. A plurality of movable compartments is provided each of which is adapted to house an animal in the storage area. Transport means are provided for moving the compartments to the receiving area to receive and remove the animal to the storage area for storing an animal at one of the discrete locations and to the exercising area to enable an animal to run into the area. The exercising area has a movable wall for gently returning the animal to the compartment after a predetermined period. Control means are also provided which are connected to the transport means for automatically transporting the animals to the various areas of the kennel. In addition, surveillance means such as television monitors and physiological monitors are provided throughout the kennel so that the animals stored in the area are completely under surveillance.

Figure 1:
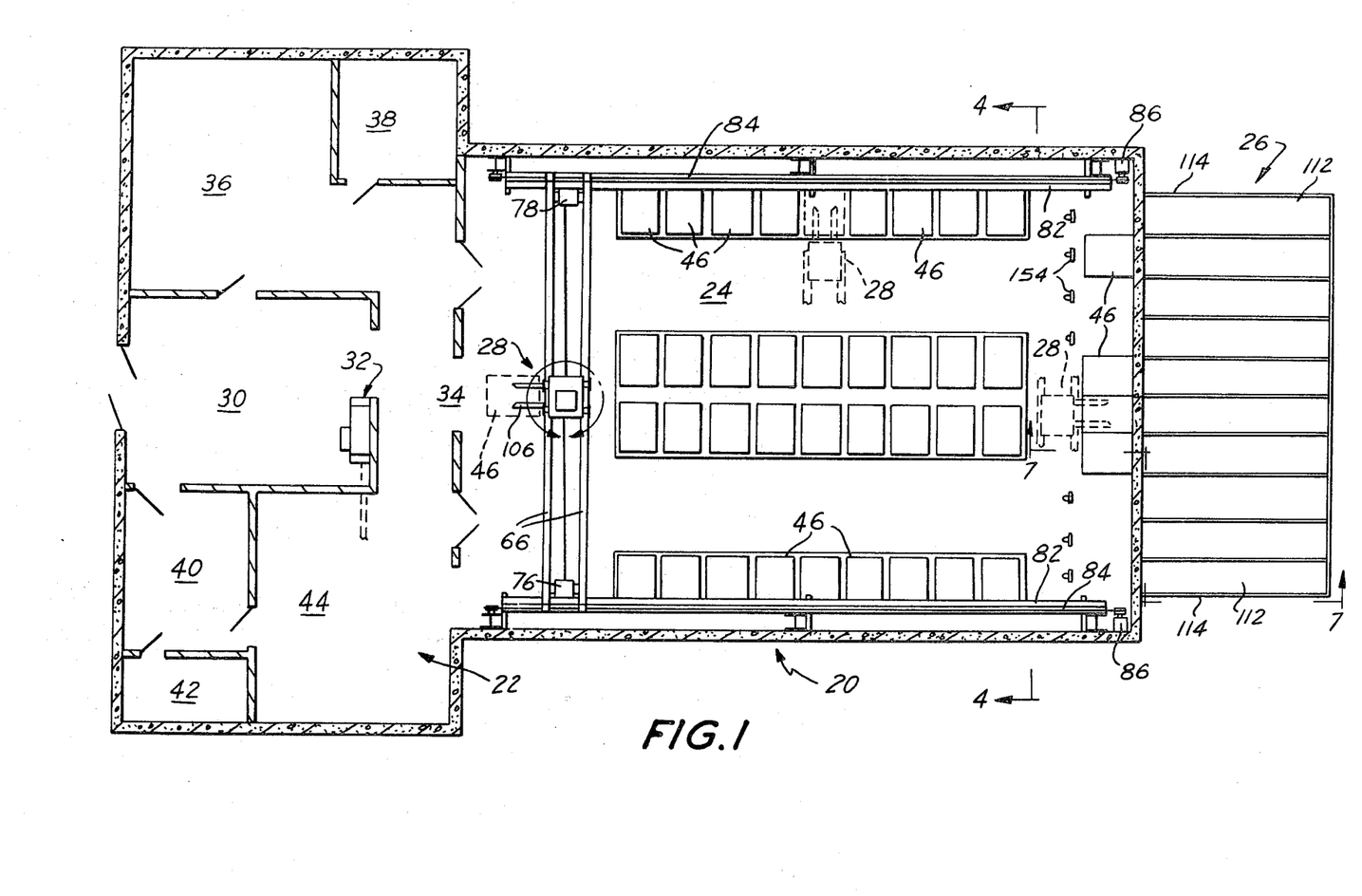
FIG. 1 is a top plan view of an automated kennel embodying the invention.

Other objects and many of the attendant advantages of this invention will be readily appreciated as the same becomes better understood by reference to the following detailed description when considered in connection with the accompanying drawings wherein:

Referring now in greater detail to the various figures of the drawing wherein like reference numerals refer to like parts, an automated kennel is shown generally at 20 in FIG. 1.

As best seen in FIG. 1, which is a top plan view of a preferred layout of an automated kennel, the kennel basically comprises a reception area 22, a storage area 24, an exercising area 26 and transport means 28.

The reception area 22 includes a receiving room 30, at which pets are brought into and taken out of the kennel 20. In the receiving room 30, a control panel 32 is provided at which an operator of the kennel can control all operations of the automated kennel. The reception area 22 also includes a receiving area 34 directly behind the receiving room 30 at which a pet is placed into a compartment for storage of the pet during its stay in the kennel. This will be seen in greater detail hereinafter.

The reception area 22 preferably includes rooms 36, 38, 40, 42 and 44 adjacent to room 30 which can be used for various kennel functions.

The storage area 24 basically comprises a plurality of discrete positions at which a plurality of movable compartments 46 can be placed having a pet therein. It should also be noted that the compartments 46 are also stored at their discrete locations within storage area 24 when empty.

Figure 6:
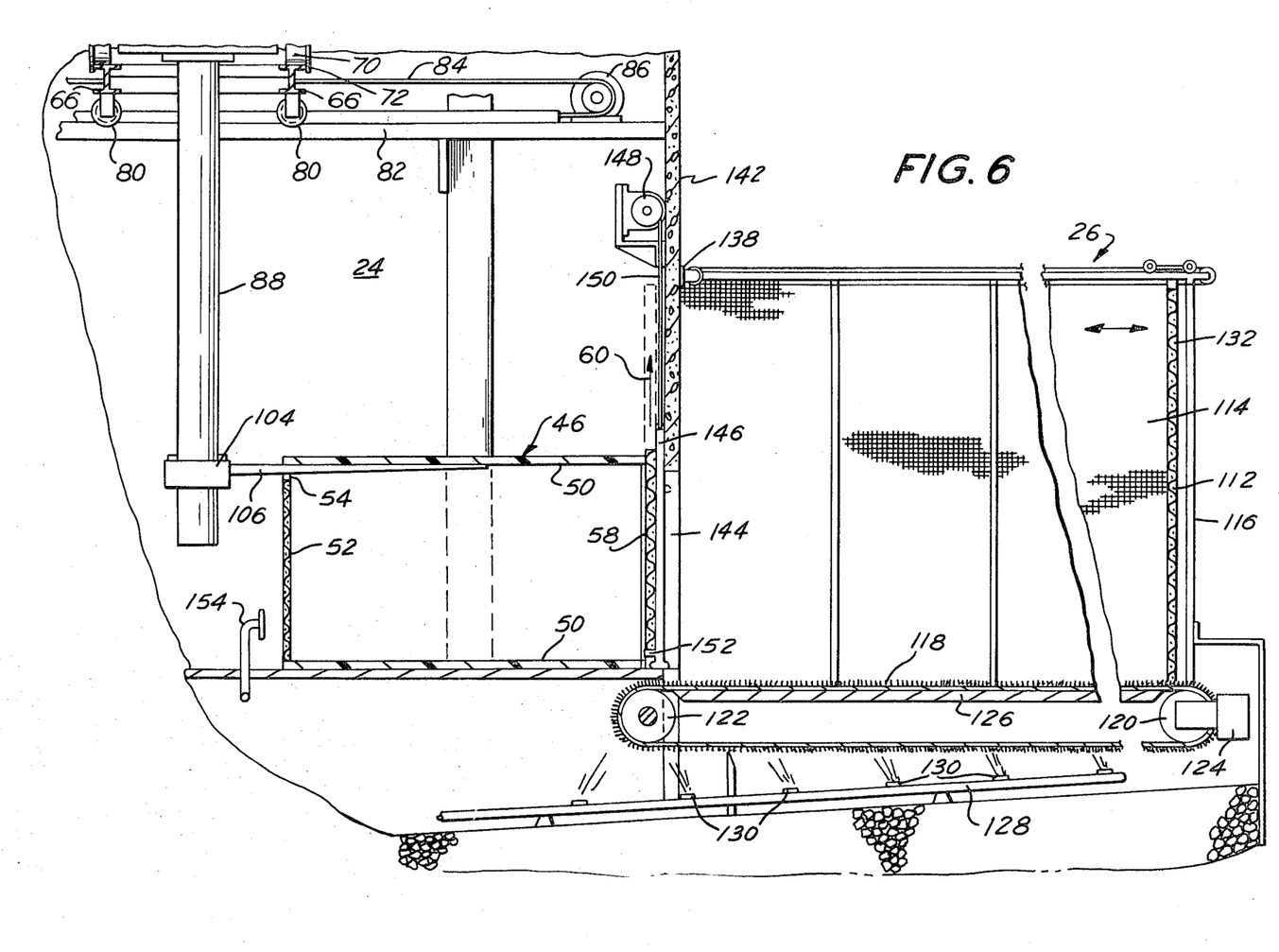
FIG. 6 is a fragmentary side elevational view taken in the connecting area between the exercising area and the storage area.
Figures 7, 8:
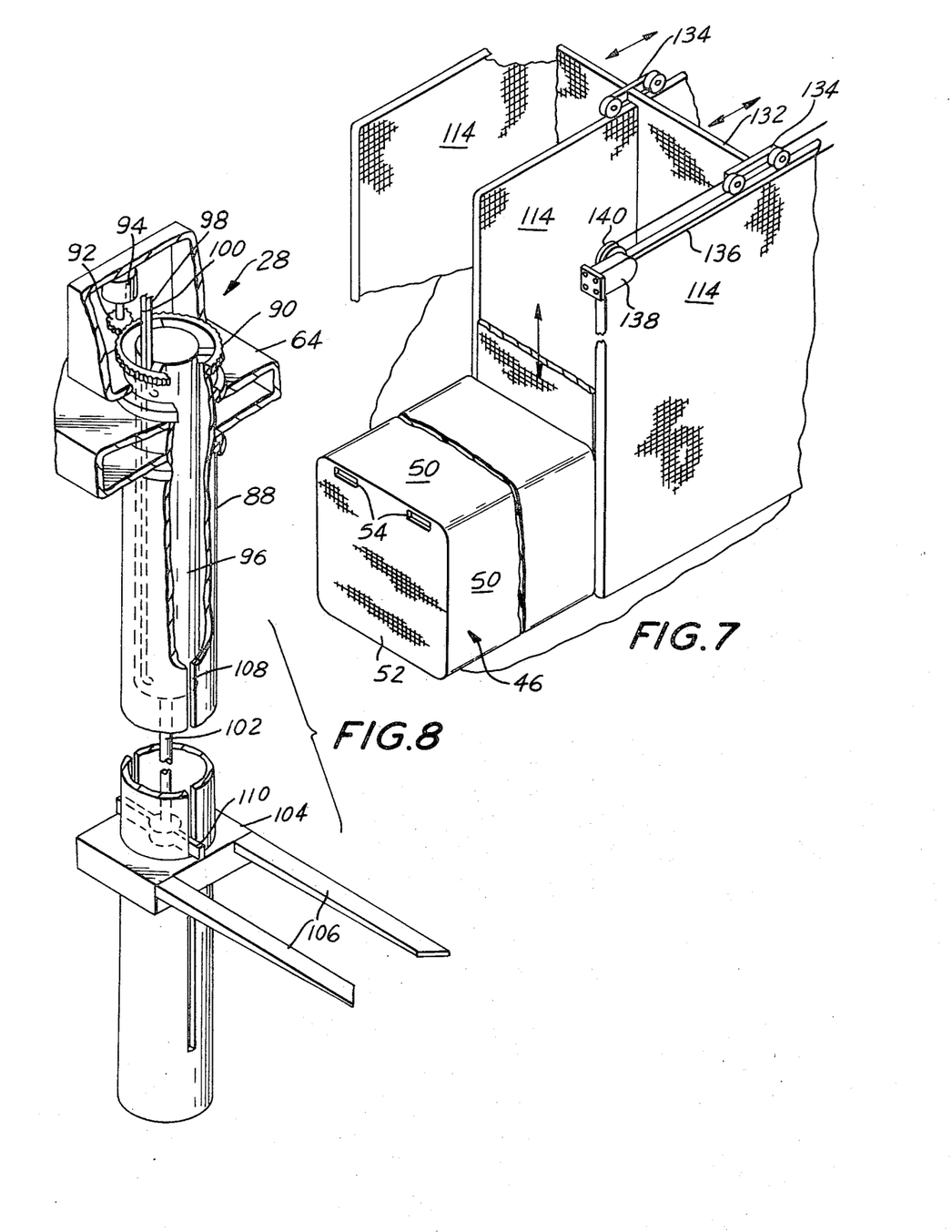
FIG. 7 is a fragmentary perspective view showing the operation of the movable wall in the exercising area for returning an animal to the movable compartments.
FIG. 8 is a perspective view with parts removed for purposes of clarity of the transport means.

As best seen in FIGS. 6 and 7, the movable compartments 46 are preferably comprised of fiberglass walls 50 which comprise the top walls and side walls of the compartment. The rear wall 52 of the compartment preferably comprises a heavy duty screen having a pair of openings 54 to accommodate the receipt of the tines of a forklift which is part of the transport means. The front wall of the compartment 46 is open and includes a slidable screen 58 which is movable upwards in the direction of arrow 60 to enable an animal to be put into and removed from the compartment 46.

Referring back to FIG. 1, it can be seen that a plurality of these compartments 46 are provided in a plurality of rows within the storage area 20.

Figure 4:
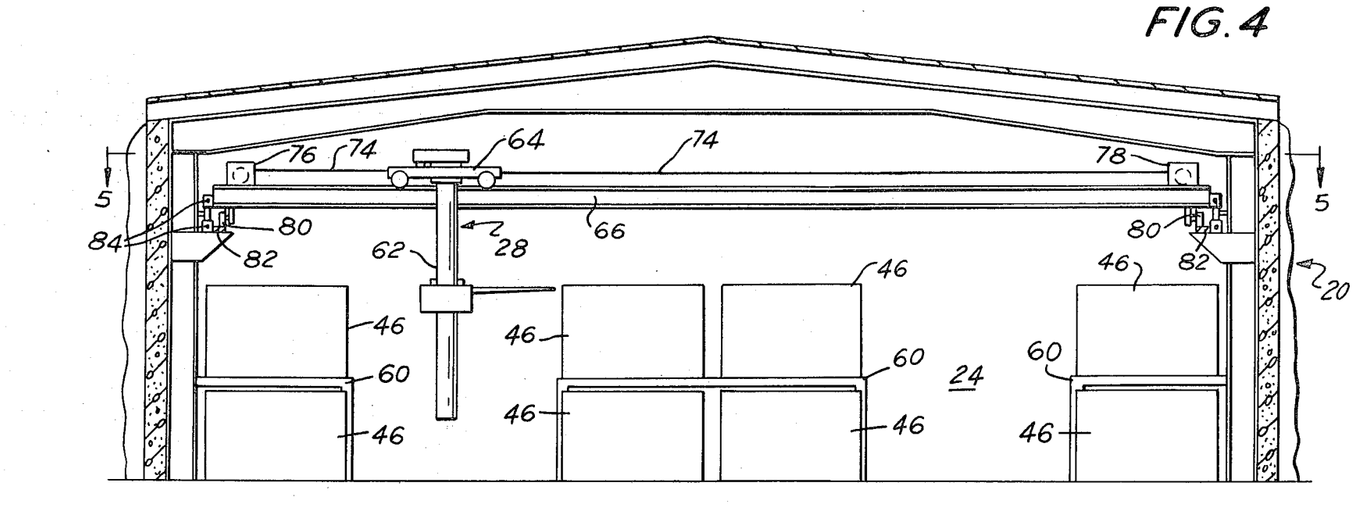
FIG. 4 is an enlarged sectional view taken along the line 4—4 in FIG. 1.

As seen in FIG. 4, each row of the storage area 24 includes a platform 60 upon which a second row of compartments can be provided so that it is not necessary to remove a compartment which is stacked upon a lower compartment in order to remove the lower compartment.

Figure 5:
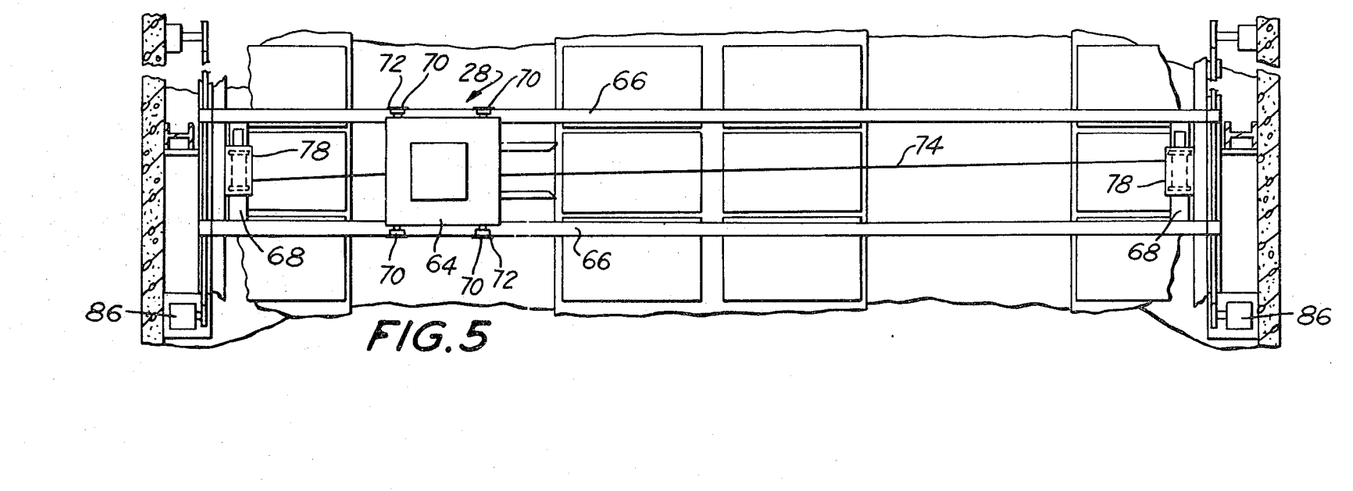
FIG. 5 is a fragmentary top plan view taken along the line 5—5 in FIG. 4.

As best seen in FIGS. 4, 5 and 6, transport means 28 basically comprises an hydraulic forklift 62 which is mounted to and depends from a carriage 64. Carriage 64 is disposed on a pair of rails 66 which, as best seen in FIG. 1, extends transversely along the width of the storage area 24. As best seen in FIG. 4, the rails 66 are mounted adjacent the roof of the kennel 20. Rails 66 are secured together and spaced apart by a pair of longitudinally extending rails 68. Carriage 64 includes a plurality of wheels 70 which are disposed on the rails 66 and enable the carriage 64 to roll along the rails 66 from one end to the other. As best seen in FIG. 5, the wheels 70 include an enlarged disk 72 which depend below the top surface of the rails 66 and act to center the carriage 64 on the rails 66 and prevent the carriage from falling off of the rails.

The carriage 64 is moved along the rails 66 by a cable 74 which is secured to carriage 64 at the center thereof and is connected at one end to the motor 76 and at the other end to a motor 78. Each of the motors has drums upon which the cable 74 is wound depending upon which direction the carriage is moved along the rails 66.

As best seen in FIG. 6, the rails 66 have a plurality of wheels 80 mounted at the bottom thereof which enable the rails to move transversely to the direction of the extension of the rails. That is, the wheels 80 are disposed on platforms 82 which, as best seen in FIGS. 4 and 6, are mounted on both sides of the kennel 20 and extend longitudinally along the side walls of the storage area 24.

As also best seen in FIG. 6, the rails 66 are drawn along platforms 82 by a pair of endless cables 84. As best seen in FIG. 1, each of the cables 84 are moved by motors 86 which drive the rails 66 along the platforms 84.

The carriage 64 of the transport means 28 is best seen in FIG. 8. As seen in FIG. 8, the carriage 64 includes an opening through which an elongated tube 88 which forms a portion of the hydraulic lift is rotatably mounted. Tube 88 includes at the top thereof a gear 90. The gear 90 is driven by a gear wheel 92 which is driven by motor 94. When motor 94 is energized, the rotation of gear 92 causes the rotation of the tube 88. Tube 88 has mounted therein a housing 96 for a piston which is moved up and down within housing 96 by the pressure applied through pipes 98 and 100. The piston is connected to shaft 102 which is in turn connected to a lifting fork 104 having a pair of tines 106. The tube 88 includes a pair of elongated slots 108 which are diametrically opposed from each other and in which a bar 110 is mounted which is secured to the lifting fork 104. The lifting fork 104 includes an opening through which the tube 88 extends. As best seen in FIG. 8, the shaft 102 is connected to the lifting fork via the bar 110 and causes the lifting fork to be moved up and down along the tube 88 in accordance with pressure provided via pipes 98 and 100 to the piston housing 96. The bar 110 prevents rotation of the lifting fork with respect to the tube so that if the tube is rotated, there is rotation of the lifting fork with the tube.

Referring to FIG. 1, the exercise area 26 includes a plurality of runs. As best seen in FIG. 6, each run 112 includes a fenced in area having a pair of side screens 114 and an end wall 116. The floor of the runs 112 is comprised of an artificial turf 118. The artificial turf is provided in an endless loop which is disposed around a pair of drums 120 and 122. Drum 120 is driven by a motor 124 so that after a predetermined period of time when the animal has been in the run of the exercise area and is then removed, the drum 120 is rotated thereby causing the portion of artificial turf 118 which was exposed in the upper surface to be moved to the lowermost surface. The uppermost surface of the artificial turf is supported by a floor panel 126. A pipe 128 is provided beneath the lower surface of the artificial turf and has a plurality of nozzles 130 which enable effluent such as steam or hot water to be sprayed against the lower surface of the artificial turf 118 to clean the lower side of the turf. Thus, after the drum 120 is rotated to provide the portion of the turf which was previously in the upper half of the drums 120 and 122 to the bottom of the drums 120 and 122 if there have been any excretions by the animal while the animal has been on the exercise run, it is quickly cleaned off while the next animal is exercising on the top portion of the artificial turf.

As also best seen in FIGS. 6 and 7, a movable wall 132 is provided which extends into each of the runs 112 of the exercising area 26. The movable wall 132 preferably comprises a screen which is supported by a plurality of roller assemblies 134 which ride on the top edge of walls 114. The roller assemblies 134 are drawn along the length of the walls 114 by an endless cable 136, which is driven by a motor 138 and is wrapped around a pair of pulleys 140 at each of the outside walls 114 of the exercising area.

As best seen in FIG. 6, the exercising area 26 is mounted adjacent to the storage area 24 and is separated therefrom by wall 142. Wall 142 has a plurality of openings 144 for the entry and exit of the animal to and from the exercising area. The opening 144 is opened and closed by a slidable door 146 which is controlled by motor 148. Motor 148 is connected to the doors via a plurality of cables 150 which are rolled on pulleys which are driven by motor 148. Each of the doors is pulled in the direction of arrow 60 to open up the port between the exercising area and the compartment 46. It should be noted that each of the doors 144 includes a horizontally disposed flange 152 which extends toward the compartment 46. When the compartment 46 is placed adjacent opening 144 by the forklift 104, the slidable wall 58 of the compartment 46 rests upon the flanges 152. Thus, when the door 146 is pulled upwardly in the direction of arrow 60, the slidable wall 58 is drawn with the door 146 thereby providing an opening for the animal to exit from the compartment 46 into one of the runs 112 of the exercising area 26. After the animal has been in the run of the exercising area for a predetermined period of time, the motor 138 is energized to cause the wall 132 to be drawn toward wall 142 very slowly. This causes the animal within the run to be carefully urged toward opening 144 to return to compartment 46. After the wall 132 has been drawn up against wall 142, the door 146 is lowered thereby lowering the wall 58 and thereby closing the compartment 46 so that the animal is stored in the compartment 46.

As best seen in FIGS. 1 and 6, a plurality of nozzles 154 are provided to the rear of the compartments 46 which are provided adjacent to the exercising area. Nozzles 154 are connected to a source of effluent which is used to clean out the compartment 46 when the animal is in the exercising area. Again the effluent preferably comprises steam or hot water which is normally provided at high pressure to assure the cleaning of compartment 46.

Figure 2:
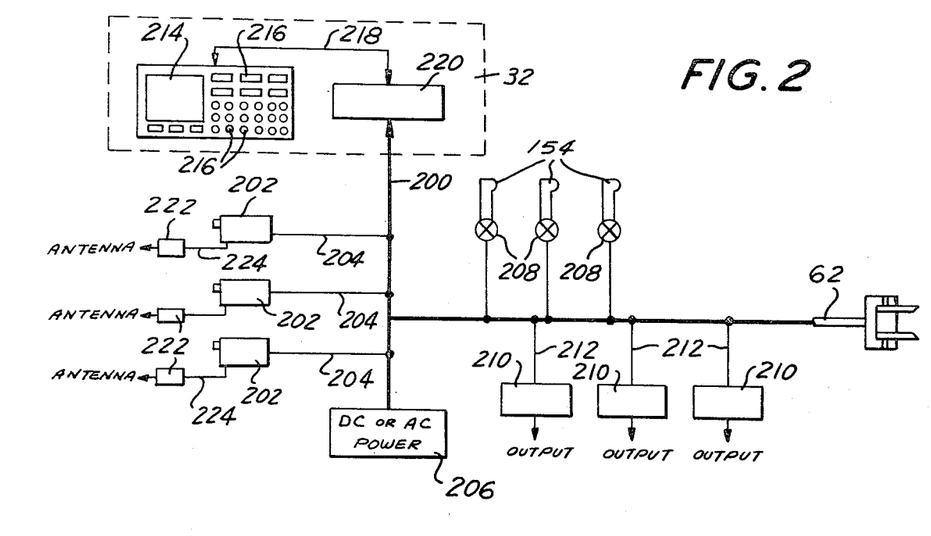
FIG. 2 is a schematic block diagram of the electronic components used throughout the system.

The various elements of the automated kennel are controlled by the components shown in FIG. 2. The control components basically comprise control panel 32, a common electrical bus system 200 for connecting the various components, television cameras 202 which are connected to the bus 200 by lines 204, a power source 206, a plurality of valve solenoids 208 for controlling the flow of effluent through nozzles 154, signal converters 210 for activating the various motor throughout the system in accordance with the code received via lines 212 from bus 200 and forklift 62 which is connected via the bus system to the control panel 32.

The control panel 32 includes a display section 214 which includes a cathode ray tube for providing the image received from the television cameras 202. Appropriate selection keys 216 are provided adjacent to the display area to enable the selection of various functions of the system. The display and selection console are connected via lines 218 to a data processor 220 which is responsive to the various keys pressed on the console to enable control of the various functions of the automated kennel. The system also includes a plurality of physiological monitors 222 which are connected to the television camera controls via line 224. The physiological monitors are preferably connected to an antenna so that it is not necessary to connect each of them via a hard wire connection to the data processor 220. However, the antennas can be replaced by hard-wiring via the bus 200 to the data processor 220. The power source 206 may be either a direct current or alternating current source. The data processor 220 is programmed so that the pressing of the keys 216 causes the appropriate signals to be provided via the processor 220 to the bus 200 so that various portions of the system can be controlled. For example, a pressing of the appropriate key 216 to cause the compartments to be cleaned will cause a code to be generated by the data processor via buses 200 which causes the solenoids 208 to be energized and thereby cause the spray of effluent via nozzles 154. Similarly, when a compartment is to be moved from one portion of the kennel to another, the appropriate signals are provided via lines 200 from the data processor 220 to cause the sequential energization of the various motors throughout the system which cause the movement of the transport means 28. This will be discussed in greater detail hereinafter with the operation of the automated kennel.

Figure 3:
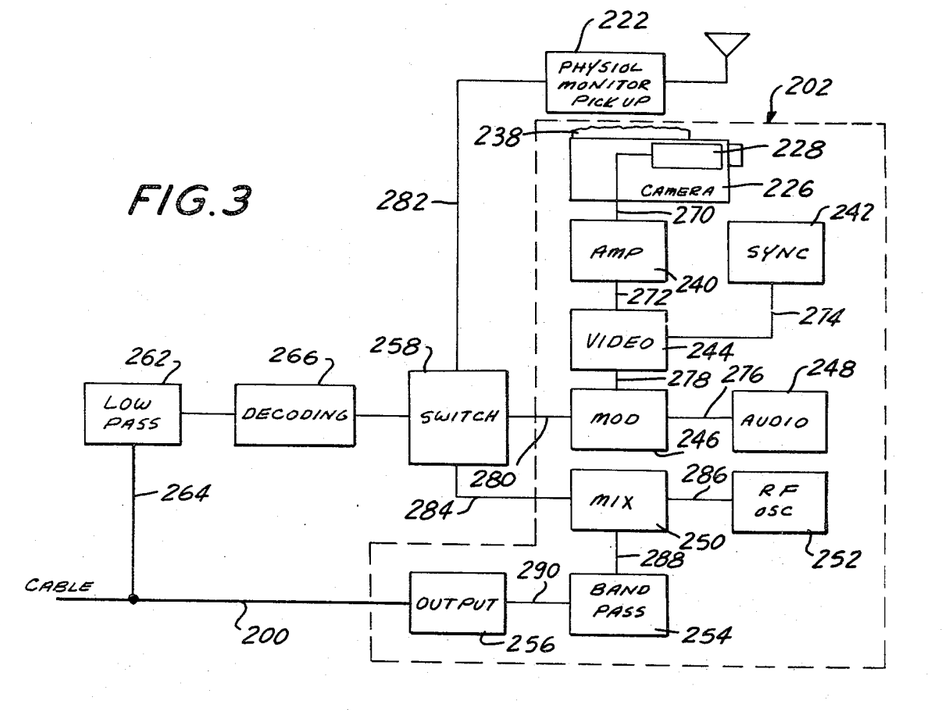
FIG. 3 is a schematic block diagram showing the electronic components used for the closed circuit television which is used for surveillance.

The closed circuit television and monitoring system is shown in greater detail in the block diagram of FIG. 3. The television camera stations 202 each include the conventional circuitry including the camera 226 which includes the appropriate lens assembly and associated vidicon tube 228. The camera is also modified in that it includes a plug-in circuit 238 which enables the connection to the circuitry of auxiliary units. The camera 202 further includes conventional amplifiers 240 and synchronizing unit 242, video signal amplifier 244, a modulator 246, an audio amplifier 248, a mixer 250, an R.F. oscillator 252, a band pass filter 254 and an output amplifier 256 to connect the output of the band pass filter to the bus cable 200. A switch 258 is provided to enable the physiological monitor pick-up 222 to utilize the audio equipment within camera 202. A low pass filter 262 is connected to bus 200 via lines 264 and the filter 262 is then connected to a decoding means 266. Decoding means 266 is connected to switch 258 and provides the signals to enable the switch 258 to determine which of the signals will be utilized by the audio amplification equipment within camera 202. The camera 226 is connected via lines 270 to the amplifier 240. Amplifier 240 is in turn connected to the video amplifier 244 via line 272. Synchronizer 242 is also connected to the unit 244 via lines 274. The audio amplifier and video amplifiers are connected via lines 276 and 278, respectively, to the modulator 246 which is in turn connected via lines 280 to the switch 258. The switch 258 is connected to the physiological monitor pick-up 222 via lines 282 and to the mixer 250 via lines 284. The R.F. oscillator 252 is connected to the mixer via lines 286. Mixer 250 is connected to the band pass filter via lines 288 and the band pass filter 254 is connected to the output amplifier 256 via lines 290.

The system of FIG. 3 is capable of automatically converting itself from a closed circuit television surveillance mode of operation to a physiological monitoring communication mode of operation in response to coded signals provided on the cable 200. Thus, the placement of television cameras throughout the kennel at suitable locations enables an operator to be able to have complete surveillance of the animals in the automated kennel by pressing the appropriate keys on the control panel 32.

The operation of the automated kennel can be seen from the following example:

Assuming that a pet is brought into the reception area 30, an operator, as best seen in FIG. 2 will press an appropriate button on the control panel 32 causing the transport means 28 to be moved to a position adjacent an empty compartment 46 at which the pet is about to be housed in the storage area 24 during its stay at the kennel. Appropriate signals are provided by the data processor within the control panel 32 to cause the motor 86 and 76 and 78 to cause the support means to be moved to a position adjacent the compartment 46 which is to be used. The data processor then provides coded signals which cause the forklift to be raised or lowered in accordance with the height of the compartment which is to be removed from its discrete location within the storage area 24. Each of the motors 76, 78 and 86 are preferably step motors that are rotated a predetermined amount each time a pulse is received. Accordingly, when the keys of the control panel are pressed, a command signal is provided to the data processor which converts the code to a number of signals which will automatically move the transport means from its present location to the desired location. Similarly, the height of the forklift is then provided in the form of appropriate signals on the bus 200 to the forklift so that the correct height will be obtained. After the forklift 62 is placed directly adjacent the appropriate compartment, the appropriate signals will be provided to cause either step motor 76 or step motor 78 to be energized to cause the transport means to be directed towards the compartment so that the tines of the forklift are inserted in the openings 54 of the specified compartment 46. After the tines 106 are inserted into openings 54, the compartment is lifted by the forklift and the transport means is then moved to the reception area 34. When the compartment 46 arrives at the reception area 34, the motor 92 within the transport means is energized to cause the rotation of the barrel 88 90° so that tines 106 face towards the reception area and thereby cause the front end of the compartment 46 to face the reception area. The operator then lifts screen 58 to enable the pet to be inserted into the compartment 46. By pressing the same location keys as were previously pressed, the compartment is automatically picked up by the transport means and returned to the original location.

After a pet has been in the compartment for a predetermined time, the transport means 28 is moved to the compartment at which the pet is located and the transport means then moves the compartment to the area adjacent the exercising area. The transport means places the compartment 46 adjacent to one of the openings 144 at the rear wall 142 of the kennel. As the forklift lowers the compartment 46 adjacent the wall 144, the screen 58 is lowered onto the flange 152 of the sliding door 146.

Control signals are then provided via the data processor to the motor 148 thereby causing the screen and the door 146 to be moved upwardly in the direction of arrow 60 thereby enabling the pet to be released into the exercising run. The transport means 28 is then removed from compartment 46 adjacent the run and is then used to carry out the next moving function. While the pet is in the exercising run, the solenoid valve controlling nozzle 54 is energized thereby enabling an effluent to be sprayed into the compartment 46 at high pressure. As can be seen below pipes 128 in FIG. 6, the waste which is cleaned out of the compartment 46 is enabled to be flushed down to the gravel and disposed of via septic tanks or other convenient or established systems. After the steam is sprayed, the compartments are completely dried through a high speed blower system which is integrated in the rear of the kennel with the associated plumbing to accomplish the steam cleaning. After the drying takes place, each compartment is automatically sprayed with a disinfectant to minimize and eliminate bacteria build-up in any given compartment.

After the pet has been exercising for a predetermined period of time, the system automatically provides energizing signals to motor 138 which thereby causes the movable wall 132 to be slowly urged towards wall 142. Each of the animals in the exercising runs is then urged into the compartment that it had been housed in in the storage area 24.

After each of the animals has been placed into the compartments, the motors 148 are sequentially energized to lower the doors 146 so that the compartments 46 are closed. The pet in compartment 46 is then returned to its original area in the storage area 24. This is done by pressing the appropriate buttons 216 on the control panel 32. The transport means is then moved in accordance with the number of signals provided to the motors which cause the positioning of the transport means 28.

When the pet is to be removed from the kennel, the operator of console 32 presses the appropriate button thereby causing the transport means to be moved towards the compartment at which the pet is located and then the transport means draws the compartment 46 back to the reception area 34 at which place the pet is unloaded from the compartment.

The operator can be eliminated merely by programming the computer to automatically provide the sequential functions in the manner well known in the art. Thus, the operator need only be available to monitor the pets and remove and receive the pets from the compartments when a new pet is to be stored in the storage area 24 or is returning home after being housed in the kennel.

As set forth above, the physiological monitoring pick-up 222 is provided adjacent to or in combination with the television cameras 202. This enables an operator to automatically move the camera from the control panel and scan or keep close surveillance over any of the animals stored in the kennel.

It should also be understood, however, that the kennel system shown in the instant application may be used in an animal hospital or dog pound. In an animal hospital where close surveillance is more important, the physiological monitoring pick-ups can be provided in each of the compartments 46. However, for the purposes of an automated kennel, it is sufficient that several cameras be placed at suitable locations through the kennel so that by movement of the camera on its tripod, the animals can be sequentially monitored. That is, the television cameras are all mounted on motor driven platforms so that they can be actuated remotely by the operator to observe any of the pets within the scanning range of a particular camera.

It can, therefore, be seen that a new and improved kennel has been provided. The kennel enables the housing of a large plurality of pets without being unduly expensive in this era of costly employees. Moreover, due to the efficient nature of the kennel, each compartment which houses a pet is thoroughly cleansed each time the pet is exercising. Further the exercising runs are kept excrement free by thorough cleansing of the exercising pad while another pet is in the exercising area.

Without further elaboration, the foregoing will so fully illustrate our invention that others may, by applying current or future knowledge, readily adapt the same for use under various conditions of service.

What is claimed as the invention is:

1. An automated kennel comprising a receiving area for animals, a storage area for animals and an exercising area, said storage area having a plurality of discrete locations for storing animals, a plurality of movable compartments, each of said compartments being adapted to house an animal in said storage area and transport means for moving said compartments to said receiving area to receive and remove the animal, to said storage area for storing an animal at one of said discrete locations and to said exercising area to enable an animal to run into said area, said exercising area having a return means for gently returning said animal to said compartment after a predetermined period and control means connected to said transport means for automatically transporting the animals to the various areas of said kennel.

2. The automated kennel of claim 1 wherein said return means comprises a movable wall which urges the animal towards its compartment.

3. The automated kennel of claim 1 wherein monitoring means are provided at suitable locations throughout the kennel for enabling the monitoring of the animals from a remote location.

4. The automated kennel of claim 3 wherein said monitoring means comprises a closed circuit television system.

5. The automated kennel of claim 4 wherein said monitoring means further includes physiological monitoring means to determined physiological data concerning each of the animals.

6. The automated kennel of claim 1 wherein said transport means includes an hydraulic forklift.

7. The automated kennel of claim 1 wherein said control means includes a control panel having a data processing means to enable automatic selection of a compartment so that selection of a predetermined location causes the automatic movement of the transport means to a predetermined location within the kennel.

8. The automated kennel of claim 1 wherein said exercising area includes a roll of artificial turf which is rolled about a pair of drums so that a flat area is exposed to the animals for exercising, the lower portion of said roll of artificial turf being mounted adjacent cleansing means for cleaning the lower portion of said roll while an animal is exercising on the upper portion of said roll and means for rotating said roll so that the cleansed area is provided on the upper portion of said roll so that the next animal exercising in said area can romp on a clean portion of said turf.

9. The automated kennel of claim 1 wherein cleansing means are provided adjacent said exercising area so that said compartments are cleaned while the animal stored therein is exercising in said exercising area.

10. The automated kennel of claim 1 wherein said transport means comprises a carriage and a forklift depending therefrom, said carriage being movable on a plurality of rails, motion generators comprising motors for drawing said carriage along said rails, said carriage further including a motor for rotating said forklift so that said forklift can be used for lifting, rotating and transporting said compartments throughout said kennel.

11. The automated kennel of claim 10 wherein said forklift includes a pair of tines and said compartments each include a pair of openings for reception of said tines.

12. The automated kennel of claim 1 wherein said compartments each include a slidable end wall which is moved upwardly to open said compartment for entry and removal of an animal.

13. The automated kennel of claim 12 wherein said kennel includes a plurality of slidable doors between said exercising area and said storage area, said doors each including a flange extending inwardly of said storage area, said compartments being located adjacent said doors when said animals are to be exercised, said end wall of said compartment being disposed on said flange of said door so that opening of said door causes simultaneous opening of said compartment.

14. The automated kennel of claim 3 wherein said monitoring means includes a television receiver for enabling the operator to view said animals at a remote location.

* * * * *